June 14, 1927.
W. G. HOUSKEEPER
1,632,075
WINDING MACHINE
Filed Jan. 4, 1924
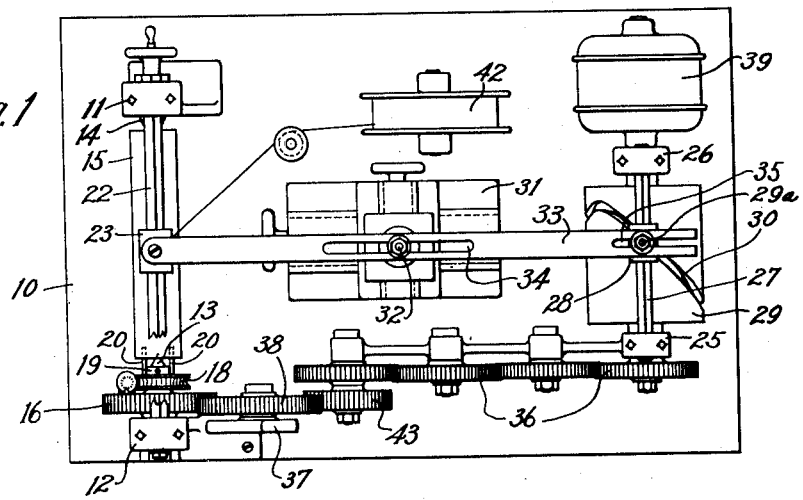
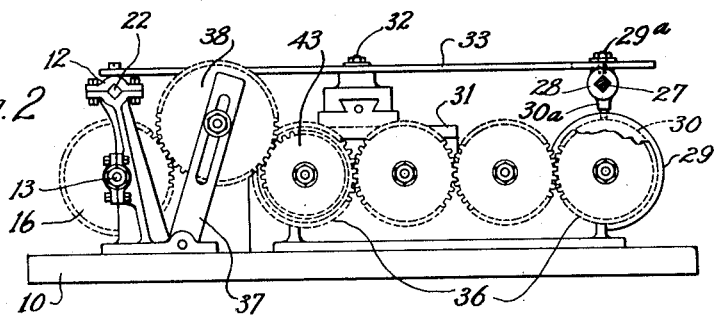
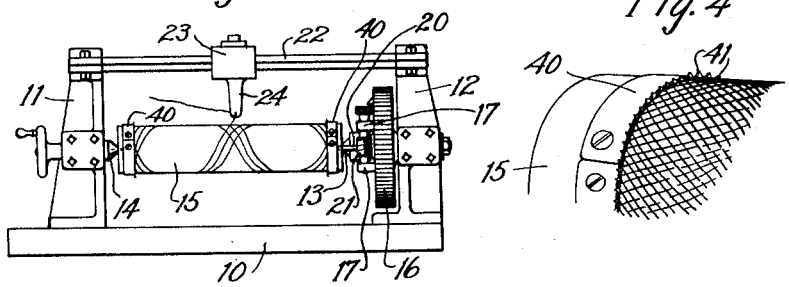 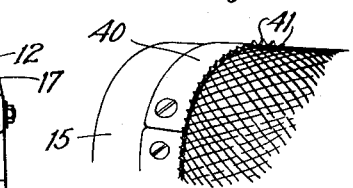
Inventor:
William G. Houskeeper,
by  E. W. Adam  Atty.

Patented June 14, 1927.

1,632,075

UNITED STATES PATENT OFFICE.

WILLIAM G. HOUSKEEPER, OF EAST ORANGE, NEW JERSEY, ASSIGNOR TO WESTERN ELECTRIC COMPANY, INCORPORATED, OF NEW YORK, N. Y., A CORPORATION OF NEW YORK.

WINDING MACHINE.

Application filed January 4, 1924. Serial No. 684,303.

This invention relates to the manufacture of vacuum tube grid electrodes comprising a succession of over-lying wire helices having parallel and intersecting turns such as disclosed in my copending application Serial No. 643,871, filed June 7, 1923.

The invention has for its object to produce wire mesh cylinders of the above and similar types in a quick, simple and efficient manner.

To attain this object, there is provided a rotatable mandrel upon which a wire may be wound, a member adapted to guide the wire back and forth along the mandrel as the latter is rotated, means on the ends of the mandrel about which the wire is passed as the guide member reverses its direction of movement, and means for rotating the mandrel and operating the guide member. The operation of the guide member is so timed with respect to the rotation of the mandrel that for each complete oscillation of the guide member the mandrel is rotated a fraction less than an integral number of turns, so that the turns of the alternate helices are parallel to but spaced from each other. The wire is wound on the mandrel until, after a predetermined number of revolutions of the mandrel, the guide member and the mandrel acquire their original relation. This operation produces a wire mesh cylinder which may be attached to supporting rods to be utilized as the grid of a vacuum tube as disclosed in my aforementioned application.

Referring now to the drawings, Fig. 1 is a plan view of a machine embodying this invention.

Fig. 2 is a side elevation thereof.

Fig. 3 is an end view and Fig. 4 is an enlarged detail view.

On a plate 10 are provided a pair of supports 11 and 12. A shaft 13 is journaled in the frame 12 and extends a short distance toward the frame 11, the end thereof being conical. In the support 11 is provided an adjustable centering pin 14. The mandrel 15 is supported between the shaft 13 and the pin 14 by the engagement of the heads or the ends of 13 and 14 in sockets provided in the ends of the mandrel. A pinion 16 is rotatably mounted on the shaft 13 and is provided with a pair of projections 17. A worm wheel 18 also rotatably mounted upon shaft 13 independent of pinion 16 and held in place by a collar 19 is provided with a pair of pins 20 adapted to fit in recesses in the mandrel 15, whereby the latter may be rotated. Supported by the projections 17 is a worm screw 21 which meshes with the teeth of the work wheel 18. By means of this arrangement the worm wheel and hence the mandrel may be moved relative to the pinion 16.

A guide rod 22 extends between and is supported by the upper ends of the supports 11 and 12. Slidably mounted on the rod 22 is a rider 23 having a depending arm 24 provided with an aperture. At the opposite end of the plate 10 is provided a pair of supports 25 and 26, between the upper ends of which extends guide rod 27. Slidably mounted on the guide rod 27 is a rider 28 having an upwardly projecting pin 29$^a$ and a downwardly extending finger 30$^a$. Supported on a shaft journaled in the supports 25 and 26 is a cylinder 29 having a cam groove 30 which extends around the cylinder from a point near one end to a point near the other end and then back to the first point. Between the mandrel 15 and the cam cylinder 29 is a compound head 31, the top slide of which is provided with a vertical pin 32. A lever 33, having one end pivoted to the rider 23, is provided with an elongated slot 34 which embraces the pin 32, and at its other end is provided with a slot 35 which embraces the pin 29 on the rider 28. Having the wire guide mounted upon the rod 22 insures the wire being fed to the mandrel at the same angle throughout its length, and the arrangement of the lever 33 allows the transfer of oscillating motion to straight line motion.

On the plate is supported a train of gears 36, the right hand one of which is keyed to the shaft of the cam cylinder 29. A lever 37 is pivotally supported by the frame 12 and has adjustably mounted thereon a pinion 38 which meshes both with the pinion 16 and a change gear 43 mounted on the shaft of the left hand pinion of the gear train 36. By means of this gearing arrangement the motor 39, the armature of which is attached to the cam cylinder shaft, is utilized to drive both the cam cylinder 29 and the mandrel 15. The ratio of speeds between the cam cylinder 29 and the mandrel 15 may be altered by utilizing pinions 38 and 43 of different sizes.

It is obvious that an operation of the machine results in a rotation of the mandrel 15 and an oscillation of the rider 23 back and forth along the guide 22, due to the reciprocation of the rider 28 on the guide 27 by the cam cylinder 29. The extent of reciprocation of the rider 23 may be varied by moving the pin 32 to the right or the left, and the position of the path of reciprocation of the rider 23 relative to the mandrel 15 may be varied by moving the pin 32 parallel to the axis of the rotating members.

At each end of the mandrel is provided a collar 40 having a plurality of radially extending prongs 41. These prongs serve to prevent slipping of the winding with respect to the mandrel upon reversal of motion of the rider 23.

In the operation of the machine a wire is led from a supply reel 42 through the aperture in the projection 24 of the rider and is fastened to one end of the mandrel. As the mandrel rotates the rider 23 moves along the rod 22 until it reaches the end of its throw. At that point it reverses and wraps the wire around one of the prongs 41 and then starts back to its original position where it again reverses and wraps the wire around a prong 41 on the opposite end. The relative speeds of the cam cylinder 29 and mandrel 15 are so selected that for each complete reciprocation of the rider 23 the mandrel has been rotated a fraction less than a whole number of turns, so that at each end of its path of reciprocation, the rider 23 wraps the wire around a prong spaced somewhat from the prong about which it wrapped the wire at its preceding stroke. The wire is thus laid in a succession of overlapping helices, the turns of the successive helices intersecting each other and the turns of alternate helices being parallel to each other. The operation of the device is continued until the number of revolutions of each has a common factor. At this time the relation of the rider and mandrel will be such that further operation will cause the wire to traverse the first helix. If desired to add further layers directly superimposed on the first set the operation is continued until the desired number of layers is wound.

If the operation is stopped at the point above referred to there has been constructed on the mandrel a wire mesh cylinder having substantially diamond shaped apertures of a predetermined size. If it is desired to further decrease the size of the apertures of the mesh, the mandrel may be rotated relative to the pinion 16 by means of the worm screw 21 and worm 18 so that the turns of another helix wound on the mandrel will be spaced slightly from the turns of the first helix and the turns of the following helices wound on the mandrel will be spaced a like amount from the corresponding previously wound helices. By proper adjustment of the worm screw 21, the mandrel 15 may be brought into such relation with the remainder of the mechanism as to permit the addition of several series of windings, in which the turns of the successive windings are equally spaced. The apertures of the mesh may thus be made as small as desired.

It is, of course, understood that various modifications may be made in the structure without in any way departing from the spirit of the invention as set forth in the appended claims.

What is claimed is:

1. In combination, a rotatable mandrel, a rotatable cam having its axis parallel to the axis of said mandrel, a lever supported between said mandrel and said cam, a rod parallel to the axis of said mandrel, a wire guiding member slidably mounted thereon, connections between the opposite ends of said lever and said guide member and cam respectively, and means for rotating said mandrel and said cam.

2. In combination, a rotatable mandrel, a rotatable cam having its axis parallel to the axis of said mandrel, a guide rod parallel to the axis of said mandrel, a second guide rod parallel to the axis of said cam, a lever supported between said cam and said mandrel, a wire guiding rider on the guide rod parallel to said mandrel, a rider on said other guide rod, a finger on said last named rider arranged to engage said cam, a pivotal connection between one of said riders and one end of said lever, a sliding connection between the opposite end of said lever and the other of said riders, and means for rotating said mandrel and said cam.

3. In combination, a mandrel, a guide rod parallel to the axis of said mandrel, a rotatable shaft having a cam groove therein, a guide rod parallel to the axis of said cam shaft, a pin intermediate said mandrel and said shaft, a lever having a slot through which said pin extends, a wire guiding rider on said first mentioned guide rod, a rider on said second mentioned guide rod, a finger carried by said second rider and extending into said cam groove, a pivotal connection between one end of said lever and one of said riders, and a pin and slot connection between the other end of said lever and said other rider, and means for rotating said mandrel and said shaft.

4. In combination, a mandrel, a guide rod parallel to the axis of said mandrel, a rotatable shaft having a cam groove therein, a guide rod parallel to the axis of said cam shaft, a pin intermediate said mandrel and said shaft, a lever having a slot embracing said pin, a rider on said first mentioned guide rod, a pivotal connection between said rider and said lever, a rider on said second-mentioned guide rod, a pin and slot connection between said last-mentioned rider and the other end of said lever, a finger carried by said second rider and extending into said cam groove, a wire guiding member carried by said first-mentioned rider, and means for rotating said mandrel and said shaft.

In witness whereof, I hereunto subscribe my name this 3 day of January A. D., 1924.

WILLIAM G. HOUSKEEPER.